US 6,578,047 B1

(12) United States Patent
Deguchi

(10) Patent No.: US 6,578,047 B1
(45) Date of Patent: Jun. 10, 2003

(54) SYSTEM FOR SEARCHING A DATA BASE FOR INFORMATION ASSOCIATED WITH BROADCAST SEGMENTS BASED UPON BROADCAST TIME

(75) Inventor: Yuichiro Deguchi, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/401,103

(22) Filed: Sep. 22, 1999

(30) Foreign Application Priority Data

Mar. 25, 1999 (JP) .......................................... 11-081533

(51) Int. Cl.[7] .............................................. G06F 17/30
(52) U.S. Cl. ....................................................... 707/104
(58) Field of Search ......................................... 707/104

(56) References Cited

U.S. PATENT DOCUMENTS

| 5,604,744 | A | * | 2/1997 | Andersson et al. | 370/347 |
|---|---|---|---|---|---|
| 5,734,720 | A | * | 3/1998 | Salganicoff | 380/211 |
| 5,758,257 | A | * | 5/1998 | Herz et al. | 725/116 |
| 5,774,664 | A | * | 6/1998 | Hidary et al. | 725/110 |
| 5,977,964 | A | * | 11/1999 | Williams et al. | 345/721 |
| 5,991,737 | A | * | 11/1999 | Chen | 705/26 |
| 6,005,561 | A | * | 12/1999 | Hawkins et al. | 345/327 |
| 6,052,145 | A | * | 4/2000 | Macrae et al. | 725/50 |
| 6,100,884 | A | * | 8/2000 | Tomita et al. | 345/721 |
| 6,105,134 | A | * | 8/2000 | Pinder et al. | 713/170 |
| 6,124,854 | A | * | 9/2000 | Sartain et al. | 345/327 |
| 6,199,076 | B1 | * | 3/2001 | Logan et al. | 715/501.1 |
| 6,246,767 | B1 | * | 6/2001 | Akins et al. | 380/210 |
| 6,268,849 | B1 | * | 7/2001 | Boyer et al. | 345/327 |
| 6,298,482 | B1 | * | 10/2001 | Seidman et al. | 725/101 |
| 6,453,339 | B1 | * | 9/2002 | Schultz et al. | 709/206 |

* cited by examiner

Primary Examiner—Wayne Amsbury
(74) Attorney, Agent, or Firm—Oblon, Spivak, McClelland, Maier & Neustadt, P.C.

(57) ABSTRACT

A play list comprising the names of music pieces broadcasted from a broadcast station and broadcast time information are accumulated in a data base. If a user likes a music piece broadcasted from the broadcast station, he activates a book marker which stores time information representing the time at which the book marker is activated. The time information is supplied through a gateway device to a search engine which searches the data base for those broadcast stations in the user's geographic area which broadcasted music pieces or the like at a time that matches the time information. The search results are transmitted to the gateway device and displayed.

61 Claims, 13 Drawing Sheets

FIG. 3
| STATION NAME | 95. 5 XYZA |
|---|---|
| AREA | NEW YORK |
| START TIME | 12 : 44 : 50 |
| END TIME | 12 : 49 : 15 |
| CONTENT | x x x x  x x x x |
FIG. 4
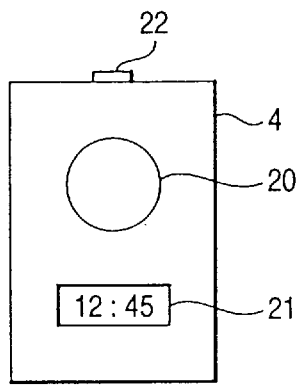
FIG. 5
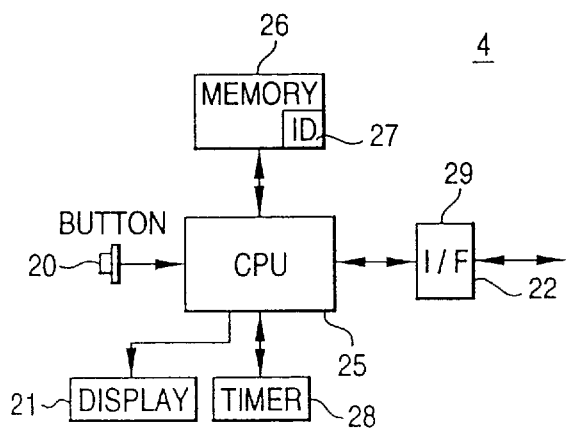

| TERMINAL ID : XXXX–YYYY–ZZZZ | |
|---|---|
| BOOK MARK 1 | 1/11/98 12:45 |
| BOOK MARK 2 | (BLANK) |
| BOOK MARK 3 | (BLANK) |
| BOOK MARK 4 | (BLANK) |
| ⋮ | ⋮ |

SYSTEM FOR SEARCHING A DATA BASE FOR INFORMATION ASSOCIATED WITH BROADCAST SEGMENTS BASED UPON BROADCAST TIME

BACKGROUND OF THE INVENTION

The present invention relates to a search technique to search for and obtain broadcasted information precisely after having been broadcasted.

There have hitherto been data base systems for searching data stored as a data base and accumulated on a computer-system. A user retrieves desired information by operating a terminal device which is connected to a data base system directly. or through a network. For example, the user inputs from the terminal device a keyword representing the desired information; and the data base system carries out a search operation on the basis of the input keyword. The search results are supplied through the terminal device to the user. When the amount of information thus supplied is large, the user inputs additional keywords to perform a narrower search operation on the supplied information.

The case where a user searches music data accumulated in a data base system will be described. For example, on the basis of the search result, the user may retrieve title information, etc. of a CD (Compact Disc) on which desired music pieces are recorded, which is useful if the user wishes to purchase the CD. Here, the music data is information related to the music pieces, and it constitutes various information such as the titles of the music pieces, the names of the artists, the record album title, that is, the title of the music CD, the year of recording or public performance, the selling agency, etc. The music data may contain the audio data of the music data themselves. In the data base system, keywords, such as the artist's name, the title of the music piece, the record album title, and the like are appended to the music data as appendant information.

Let it be assumed that a user likes a music piece which is being broadcasted on a radio station and wishes to obtain information on that music piece. After the broadcast, the user searches the music data base by inputting the keywords that are appended to the music data, which keywords had been included in the announcer's introduction of that music piece. Of course, if the keywords are not properly input, a successful search for that music piece will not be obtained. Accordingly, in the related art, there is the problem that the user will not obtain the information he desires if the user forgets the appendant information of the music piece that was broadcasted.

One might consider the possibility that the user carries a terminal device operable at any time for searching a music data base so that he may use the terminal device to perform a search operation whenever a favorite music piece is broadcasted However, it is very cumbersome to carry the terminal device at all times.

One might also consider the case where the user first begins to listen to the music piece from some midpoint thereof Since he could not hear the announcer's introduction, the user cannot know the appendant information of the music piece, and thus he cannot know what should be input as a keyword.

Now, for digital broadcast, the appendant information may be superposed on the broadcasted music data and may not be part of the announcer's introduction. The user can obtain the appendant information from the broadcasted digital data. However, this requires that appendant information be created and superposed on every music data to be transmitted from a broadcast station, and thus a large load is imposed on the broadcast station. This also requires the user's reception device be designed to pick up the appendant information thus superposed.

SUMMARY OF THE INVENTION

Therefore, an object of the present invention is to provide a technique to perform a search operation on a data base that is searchable by keywords associated with the contents of that data base even when the user does not know a correct keyword when the contents are searched.

According to an aspect of the present invention, a search system is provided for searching a data base for information associated with segments of broadcast information. An input device includes a store for storing time information representing a broadcast time at which a segment is broadcast. A communication device transmits the stored time information to a search device which accumulates a data base representing the segments and the broadcast times of respective segments. The data base is searched for information associated with those segments having broadcast times that match the transmitted time information.

As another aspect, the present invention searches a data base for information associated with segments of broadcasted material. A data base representing the segments and broadcast times at which respective segments are broadcasted is accumulated. The data base is searched for information associated with those segments having broadcast times that match time information which is input from an input device and represents the broadcast time at which a segment is broadcasted.

According to a further aspect of the present invention, an input device is provided for searching a data base comprised of accumulated information representing broadcast segments and broadcast times at which the segments are broadcasted. The input device inputs time information to a search device for searching the data base for information associated with a broadcast segment on the basis of the broadcast time at which the segment is broadcasted. At least the time information representing the broadcast time at which the segment was broadcasted is stored; and the stored time information is transmitted as a search parameter.

As a feature, the time formation is represented by the count value of a counter that counts predetermined clock signals.

BRIEF DESCRIPTION OF THE DRAWINGS

The following detailed description will best be understood in conjunction with the accompanying drawings, in which:

FIG. 3 is a schematic diagram showing a play list;

FIG. 4 is a schematic diagram showing the general appearance of an assistance terminal, that is a book marker according to the first embodiment;

FIG. 5 is a block diagram showing an example of the book marker according to the first embodiment;

DETAILED DESCRIPTION OF THE PREFERRED EMBODIMENTS

Preferred embodiments according to the present invention will be described hereunder with reference to the accompanying drawings.

Figure 1:
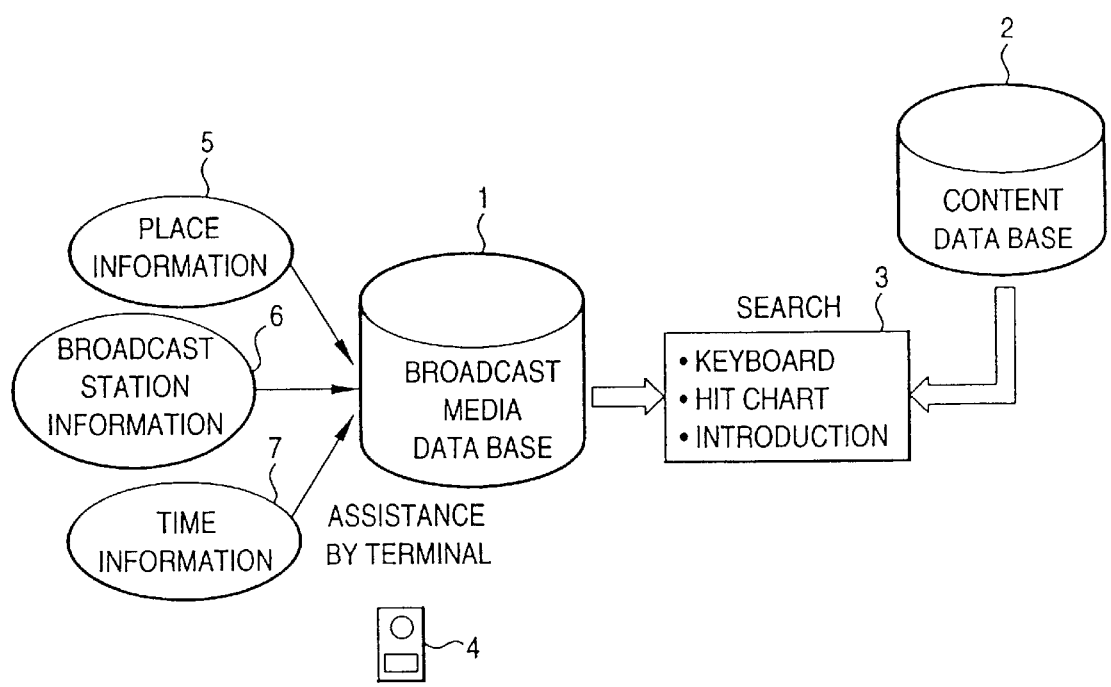
FIG. 1 is a schematic diagram showing an information search system according to the present invention.

First, a summary of the invention will be described. FIG. 1 schematically shows an information search system of the present invention. The system comprises two data bases 1 and 2, a search engine 3 for performing a search operation on these data bases 1 and 2, and an assistance terminal 4 for supplying an assistance on a search condition to a user.

In the data base 1 is accumulated information relevant to broadcast media of contents, also referred to herein as segments, which are broadcasted by broadcast media such as a radio broadcast or the like. For example, the titles of music pieces broadcasted by radio broadcast stations, the broadcast time information of the music pieces and broadcast station information are accumulated in association with one another in the data base 1. It is needless to say that information on segments of broadcast media other than the radio broadcast may be accumulated in the data base 1, or the contents are not limited to the information on the music pieces, but they may be information on commercial articles.

In the following description, it is assumed that the broadcast media is a radio broadcast and the segment supplied from the broadcast media is a music piece. In the data base 2 is accumulated information on the content, or segment, itself to be accumulated in the data base 1. For example, when the segment is a music piece broadcasted by the broadcast media, information on the segment itself such as the title of an album (CD) in which the music piece is recorded, player information, a selling agency, a selling date, etc. is accumulated in association with the title of the music piece. In addition user, or client, information on this system may be accumulated in the data base 2. ID information of users based on identification information inherent to an assistance terminal 4 described later, and other information on the users are accumulated in the data base 2.

The search engine 3 searches information accumulated in the data base on the basis of a search condition indicated by a user. The engine described here means an assembly for supplying specific functions, and the search engine 3 supplies a predetermined search function to the user.

For example, when the user likes a music piece broadcasted from a radio, the user indicates place information 5, broadcast station information 6 and time information 7 as a search condition to the search engine 3 if the user knows a broadcast station and a place, or geographic location, at which the music piece is broadcasted, and a broadcast time. The search engine 3 searches the data base 1 on the basis of the search condition thus set, and outputs the title of the music piece as a search result. The data base 2 is searched while the title of the music piece is set as the search condition, and, for example, the title of an album in which the music piece is recorded, the information on the selling agency and performing artists of the album, etc. are output. The search result of the data base 2 is returned to the user.

It is possible that a user does not know the above information 5, 6 and 7 as a search condition or the information is vague even when the user listens to a broadcast and wishes to search a favorite music piece. In the present invention, the assistance terminal 4 is dedicated to the user who may operate it for obtaining the time information 7 in advance. In addition, the place information 5 and the broadcast station-information 6 which corresponds to the user are registered as user information in the data base 2 in advance.

That is, when the user likes the broadcasted music piece, the user operates the assistance terminal 4 and stores the time information 7' at that time into the assistance terminal 4. Thereafter, on the basis of the time information 7' stored in the assistance terminal 4, the user instructs the search engine 3 to perform the search operation. The search engine 3 searches the data base 1 by using as the search condition the time information 7' and the place information 5 and the broadcast information 6 of the user which are beforehand registered in the data base 2. The data base 2 is searched on the basis of the title of the music piece obtained as the search result. The search result thus output is returned to the user as a candidate of information desired by the user.

As described above, by using the system according to the present invention, the user can operate the assistance terminal 4 to store the time information 7' into the assistance terminal 4 to obtain desired information when the user likes a music piece. broadcasted.

Figure 2:
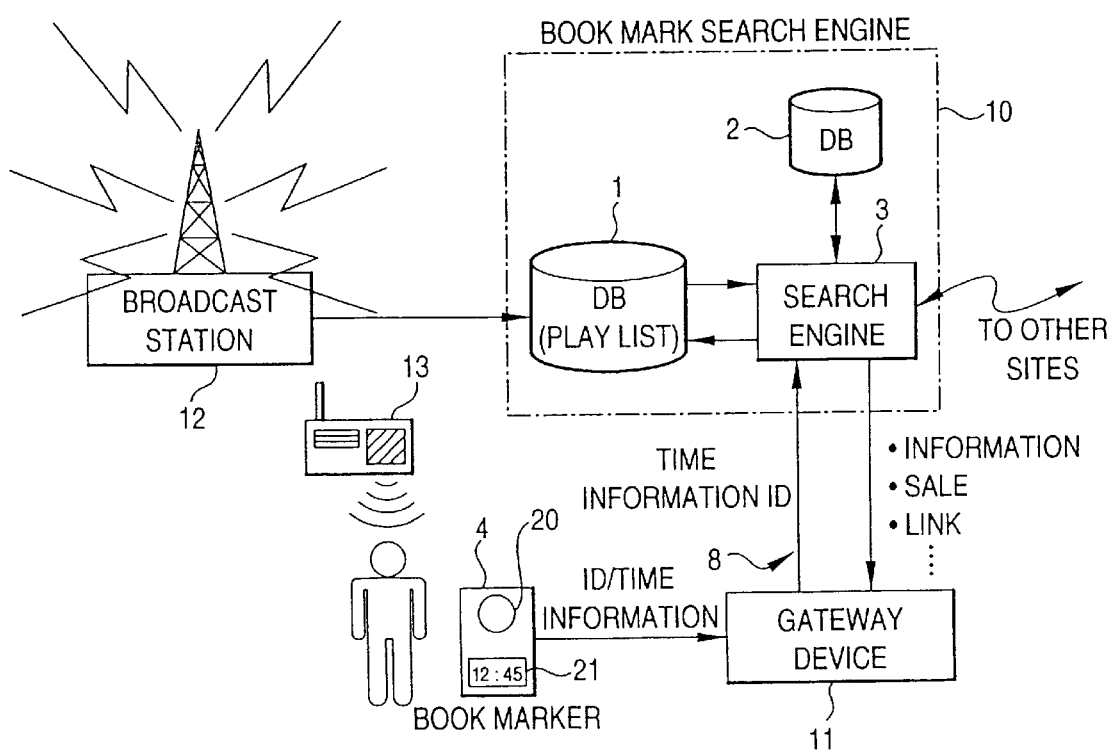
FIG. 2 is a schematic diagram showing an example of a music piece data search system according to a first embodiment.

Next, a first embodiment according to the present invention will be described. FIG. 2 shows an example of the construction of a music piece data search system according to the first embodiment. In FIG. 2, the common parts as shown in FIG. 1 are represented by the same reference numerals, and the detailed description thereof is omitted. A book mark search engine 10 is formed of the data base 1, the data base 2 and the search engine 3. The book mark search engine 10 is connected to another site (not shown) through a communication line such as the Internet or the like.

As an example, the is a place at which information open to the public on the network is placed, and the book mark search engine 10 is also one site. For example, the book mark search engine 10 is connected to a data base (not shown) at another site.

The broadcast station 12 is a radio broadcast station, for example, and it broadcasts music pieces as segments on the basis of a play list which is prepared in advance. As an alternative, the play list may be prepared after the broadcast. It is needless to say that not only music pieces, but also article or other information may be broadcasted as segments. Further, the broadcast station 12 is not limited to a radio broadcast station, but may be a television broadcast station or CATV (Cable Television) station which performs a television broadcast in a radio or wire mode, a wire broadcast station for broadcasting mainly music pieces in a wire mode or the like.

The book mark search engine 10 and the broadcast station 12 are connected to each other through a communication line such as Internet or the like. The, above-described play list is transmitted from the broadcast station 12 to the book mark search engine 10. In the book mark search engine 10, the play list thus received is accumulated in the data base 1. FIG. 3 shows an example of the play list. In the case of FIG. 3, one segment, that is, the music corresponding to one broadcasted music piece, is associated with the name of the broadcast station 12 from which the segment is broadcasted (Station Name), the broadcast area of the broadcast station 12 (Area), a broadcast start time (Start Time) of the segment (music piece), a broadcast end time, (End Time) of the segment and the name of the segment (Content).

The play list to be accumulated in the data base 1 is not necessarily transmitted from the broadcast station 12 from which the segment is actually broadcasted. For example, a play list which is prepared by manually collecting broadcasted information may be supplied to the data base 1 through a predetermined storage medium and accumulated therein. Further, a play list may be prepared by a system different from that of the broadcast station 12, and then transmitted to the book mark search engine 10. Play lists of plural different broadcast stations 12 may be accumulated in the data base 1 with the respective broadcast stations 12 being identified.

The book mark search engine 10 and the gateway device 11 are interactively connected to each other through the communication line 8 such as Internet or the like. As described in more detail later, the gateway device 11 is a personal computer, for example. It interactively communicates with the book mark search engine 10, while communicating with the assistance terminal 4 owned by the user.

The gateway device 11 is not limited to personal computers. For example, a set top box for connecting a television receiver to a digital network may be used as the gateway device 11, for example. In another case, IRD (Integrated Receiver Decoder) serving as a digital broadcast receiver may be used as the gateway device 11.

FIG. 4 shows an example of the general appearance of the assistance terminal 4 according to the first embodiment. In the following description, the assistance terminal 4 is referred to as a book marker 4. The book marker 4 has, for example, an input unit 20 comprising a button, and a display unit 21 on which the current time is displayed. Further, it is provided with a connector 22 which serves as an electrical connection point for communication with the gateway device 11.

The book marker 4 is of a relatively simple construction as described later, and can be accommodated in a compact housing, such as one used as a key holder. The book marker 4 is not limited to this embodiment, and may be installed in various other electronic devices. For example, as described later, the book marker 4 may be incorporated in a radio receiver. It may be mounted in a car stereo system. Needless to say, the target in which the book marker 4 is installed is not limited to an electronic device. The book marker 4 is preferably installed in something which is used while moving or portably used.

FIG. 5 shows an example of the construction of the book marker 4 according to the first embodiment. CPU (Central Processing Unit) 25 has a memory, a bus, a predetermined interface, etc., which, for the purpose of simplification are not shown. CPU 25 is connected to a button 20, a display unit 21, a memory 26, a timer 28 and an interface 29. The timer 28 is designed to output the current time, and can be corrected by the control of the CPU 25, as described below. The display unit 21 comprises, for example, an LCD (Liquid Crystal Display), and the display thereof is controlled by CPU 25. Time information output from the timer 28 is supplied to the display unit 21 through CPU 25, and displayed. In an alternative embodiment, the display unit 21 may be omitted.

Figures 6, 7:
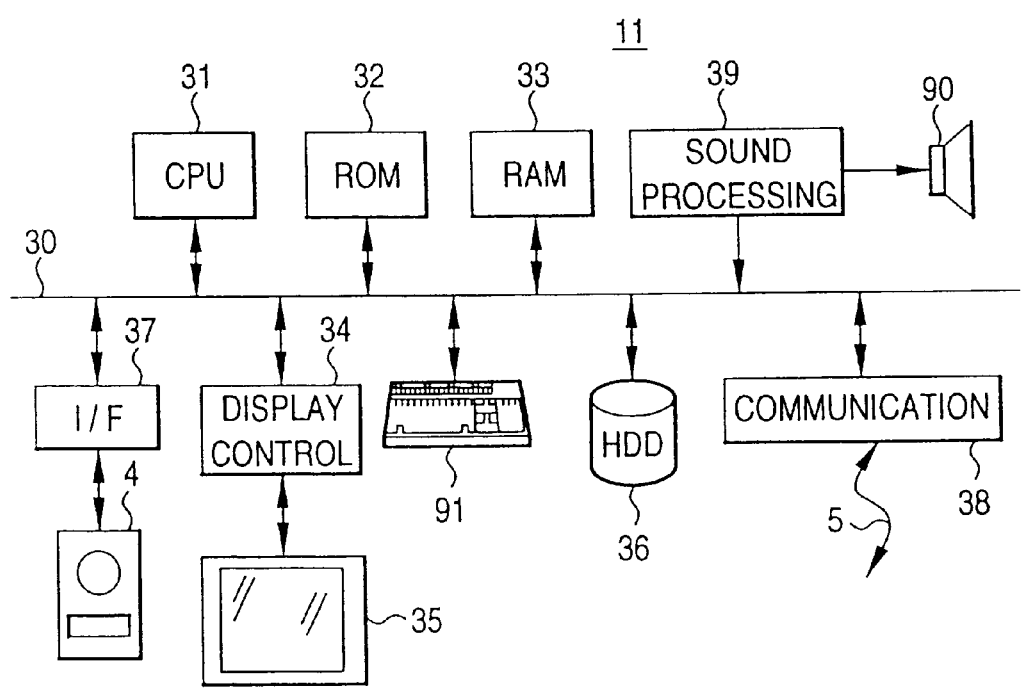
FIG. 6 is a schematic diagram showing an example of time information stored in a memory of the book marker.
FIG. 7 is a block diagram showing an example of the construction of a gateway device used in the present invention.

A user's operation of the button 20 is detected by CPU 25, and the time information present at that time in timer 28 is stored in the memory 26. As shown in FIG. 6, a plurality of time information pieces may be stored in the memory 26. Symbols based on serial numbers may be provided with the respective time information pieces so as to discriminate the time information pieces from one another. A terminal ID 27 stored in a predetermined area of the memory 26 is a unique ID to specify each individual book marker 4.

The interface 29 controls the communication with the external, that is, the gateway device 11 through the connector 22. No specific limitation is imposed on the interface protocol, or standards, of the interface 20 for the communication with the gateway device 11. For example, USB (Universal Serial Bus) may be used as the interface for communication between the book marker 4 and the gateway device 11. As an alternative, the interface protocol defined in IEEE-1394 may be used. As another alternative, RS-232C may be used as the interface for communication.

The communication is not limited to wire communication, and communication between the book marker 4 and the gateway device 11 may be performed with infrared ray. signals by using an interface protocol based on IrDA (Infrared Data Association). In this case, the connector 22 and the interface 29 are designed to communicate by infrared ray signals.

The book marker 4 may be constructed as an IC card obtained by embedding an integrated circuit and a communication device in a card, or a PC card defined by PCMCIA (Personal Computer Memory Card International association) and JEIDA (Japan Electronic Industry Development Association). When the book marker 4 is constructed as an IC card, the interface protocol of interface 29 conforms to the IC card construction. When the book marker 4 is constructed as a PC card, a connector compatible with the PC card is provided in the gateway device 11, for example. Communication between the book marker 4 and the gateway device 11 can be performed by directly mounting the book marker 4 (as the PC card) in the compatible connector.

The terminal ID 27 and the time information stored in the memory 26 can be read out from the memory 26 and output through the interface 29 to the outside on the basis of an instruction of CPU 25.

FIG. 7 shows an example of the construction of the gateway device 11. As described above, a general personal computer may be used as the gateway device 11. FIG. 7 illustrates an embodiment where a general personal computer, or alternatively, a laptop or notebook computer, is used as the gateway device 11. CPU 31, ROM (Read Only Memory) 32, RAM (Random Access Memory) 33, a display control circuit 34 and a storage medium, for example, a hard disc 36 are connected to a bus 30. An input 91 comprising, for example, a key board and a prescribed type of pointing device which can output a control signal based on the user's operation is also connected to the bus 30. CPU 31 operates on the basis of a program stored in ROM 32 or a hard disc 36, and performs predetermined processing on the basis of the operation of the input means 91 by the user. RAM 33 is used, for example, as a work memory for CPU 31. The display control signal output from CPU 31 is supplied to the display control circuit 34 to perform a display operation based on the display control signal on a display 35.

Further, an interface 37 to communicate with the book marker 4 is connected to the bus 30. The interface 37 is compatible with the interface protocol supporting the interface 29 of the book marker 4 such as USB, IEEE-1394, RS-232C, IrDA, etc.

A communication device 38 to communicate with the book mark search engine 10 through the communication line 8 also is connected to the bus 30. The communication device 38 is a modem or the like, connected to a public telephone line as the communication line 8. The gateway device 11 is connected to the Internet through the public telephone line, for example, by using the modem, and can perform interactive communication with the book mark search engine 10 through the Internet.

A sound processor 39 connected to the bus 30 converts digital audio data supplied through the bus 30 to analog audio signals. The analog audio signals output from the sound processor 39 are reproduced by a speaker 90.

As described above, it is necessary for the user to register information which identifies himself into the client data base 2 of the book mark search engine 10 in advance. The registration may be performed by using the gateway device 11. First, the user connects the book marker 4 to the gateway device 11 by a prescribed interface. The user then operates the gateway device 11 to register the user and the book marker 4 dedicated to the user.

Figure 8:
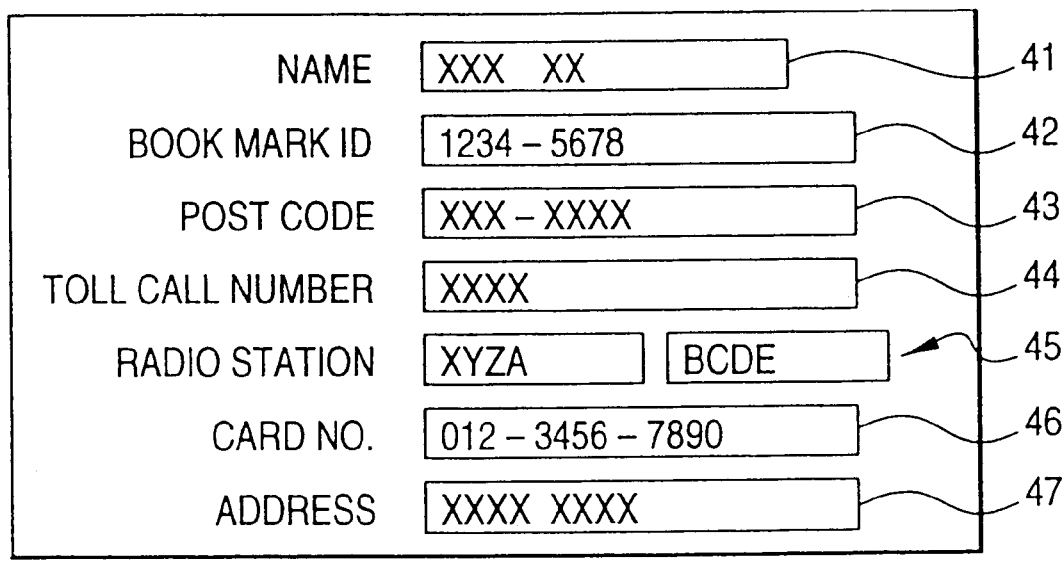
FIG. 8 shows an example of a registration frame of the book marker, as may be displayed in the gateway device.

FIG. 8 shows an example of a display on a registration frame 40 of the display 35 when the user and the book marker 4 dedicated to the user are registered. The name of the user is input to a "Name" column 41. The terminal ID 27 of the book marker 4 is input to a "book mark ID" column 42.

The input of the terminal ID 27 described above is performed by the communication between the gateway device 11 and the book marker 4. That is, a request for reading out the terminal ID 27 is transmitted from the gateway device 11 to the book marker 4. Under the control of CPU 25 based on this request, the terminal ID 27 is read out from the memory 26 in the book marker. The terminal ID 27 thus read out is transmitted to the gateway device 11 whereat it is displayed on the "book mark ID" column 42 of the display 35, and also stored in RAM 33.

Further, a post code (such as zip code) and a telephone number for toll call of the place at which the user resides are input to a "post code" column 43 and a "telephone number for toll call" column 44, respectively. The geographic area at which the user is located is schematically shown as the user's activity area on the basis of the contents input to the columns 43 and 44. An area name which is independently set in advance may be input and accessed as a result of this post code and toll call number. Information specifying a radio station which is frequently selected by the user is input to a "radio station" column 45. In this case, the name of the broadcast station (e.g. its call letters) is input. However, it is not limited to the broadcast station name, but the frequency band of a radio broadcast may be input.

A user's credit card number or cash card number is input to a "card No." column 46. The address of the user is accurately input to an "address" column 47. This information is used when a service using the book marker 4 is followed by money charging processing, as described below.

Each information segment input to the columns 41 to 47 as described above is stored in RAM 33. When a particular operation is initiated, this information is read out from RAM 33, and transmitted to the book mark search engine 10 by the communication device 38. At this time, it is preferable that the information to be transmitted is encrypted.

The timer 28 of book marker 4 may be corrected when the book marker and the gateway device 11 are connected to each other, for example, to register the terminal ID 27. When interactive communication is carried out between the book marker 4 and the gateway device 11, the timer 28 of the book marker 4 can be corrected by using the time information output from the timer (not shown) resident in the gateway device 11.

The same processing may be performed by unidirectional communication from the book marker 4 to the gateway device 11. For example, when the book marker 4 and the gateway device 11 are connected to each other to transmit the terminal ID 27 to the gateway device 11, time information from the timer 28 is transmitted to the gateway device. At the gateway device, the time information from timer 28 and the time information represented by the timer resident in the gateway device 11 may be compared with each other and the difference therebetween is used to calculate the correct time for timer 28.

In these cases, the time information of the timer resident in the gateway device 11 needs to be maintained at a correct time.

In the foregoing description, the book marker 4 has a timer. However, the present invention is not limited thereto. For example, a counter which operates with a predetermine clock period may be provided to determine time information representing the time button 20 is pushed. This time information may be the count value of the counter. For example, the count value when the user operates the button 20 is stored in the memory 26. When the book marker 4 is connected to the gateway device 11 and the count value stored in the memory 26 is transmitted to the gateway device 11, the count value at the transmission time also is transmitted to the gateway device 11 along with the count value read out from the memory 26. These count values are used to determine the actual time at which button 20 was pushed.

The timer of the gateway device 11 may be corrected by using a master clock located at the book mark search engine 10. Master clock time information is obtained when the gateway device communicates therewith through the communication line 8 by the communication device 38, and the timer of the gateway device 11 is corrected on the basis of this master time information. Alternatively, the gateway device 11 may be provided with a predetermined receiver to receive time information contained in a television broadcast or a radio broadcast, and this received time information is used to correct the timer of the gateway device 11.

The gateway device 11 calculates the differential count value between the count value which is obtained when the user pushes the button 20 and the count value when transmission from the book marker 4 is carried out. If the count period of the book marker counter is known, the differential count value is readily converted into time and from which the time at which the user pushes the button 20 in the book marker 4 is calculated. Alternatively, the count value of the counter of the book marker 4 may be measured in the gateway device after a fixed period of time following the connection of the book marker 4 to the gateway device 11, thereby calculating the differential count value even when the period of the counter of the book marker 4 is unclear.

If this timing calculation is used, the display unit 21 need not display the clock information from timer 28 and there would be no need to correct timer 28 of the book marker 4.

In the foregoing description, the book marker counter performs its counting operation with a predetermined clock period. Alternatively, the counter may be operated with a clock signal generated at any timing because the count value at the time button 20 is pushed and the time that transmission to the gateway device begins are associated with each other. For example, the counter can be operated with a clock signal based on M sequence which is generated by using a shift register and an exclusive OR circuit. Alternatively, the clock signal may be periodically varied to operate the counter. Of course, the gateway device 11 needs to know the type of clock signal used by the counter in the book marker 4. Use of these clock signals to operate the counter can prevent unauthorized manufacture or use of the book marker 4.

In the foregoing description, the time at which the button 20 is pushed in the book marker 4 is determined on the gateway device 11. Alternatively, the gateway device 11 simply may provide time information representing the time at which the button 20 is pushed, and time information representing the time at which this time information is transmitted from the book marker to the gateway device; and this time information is transmitted to the search engine 10 from which the accurate time at which the button is pushed can be determined as a function of the master clock of the search engine.

Figure 9:
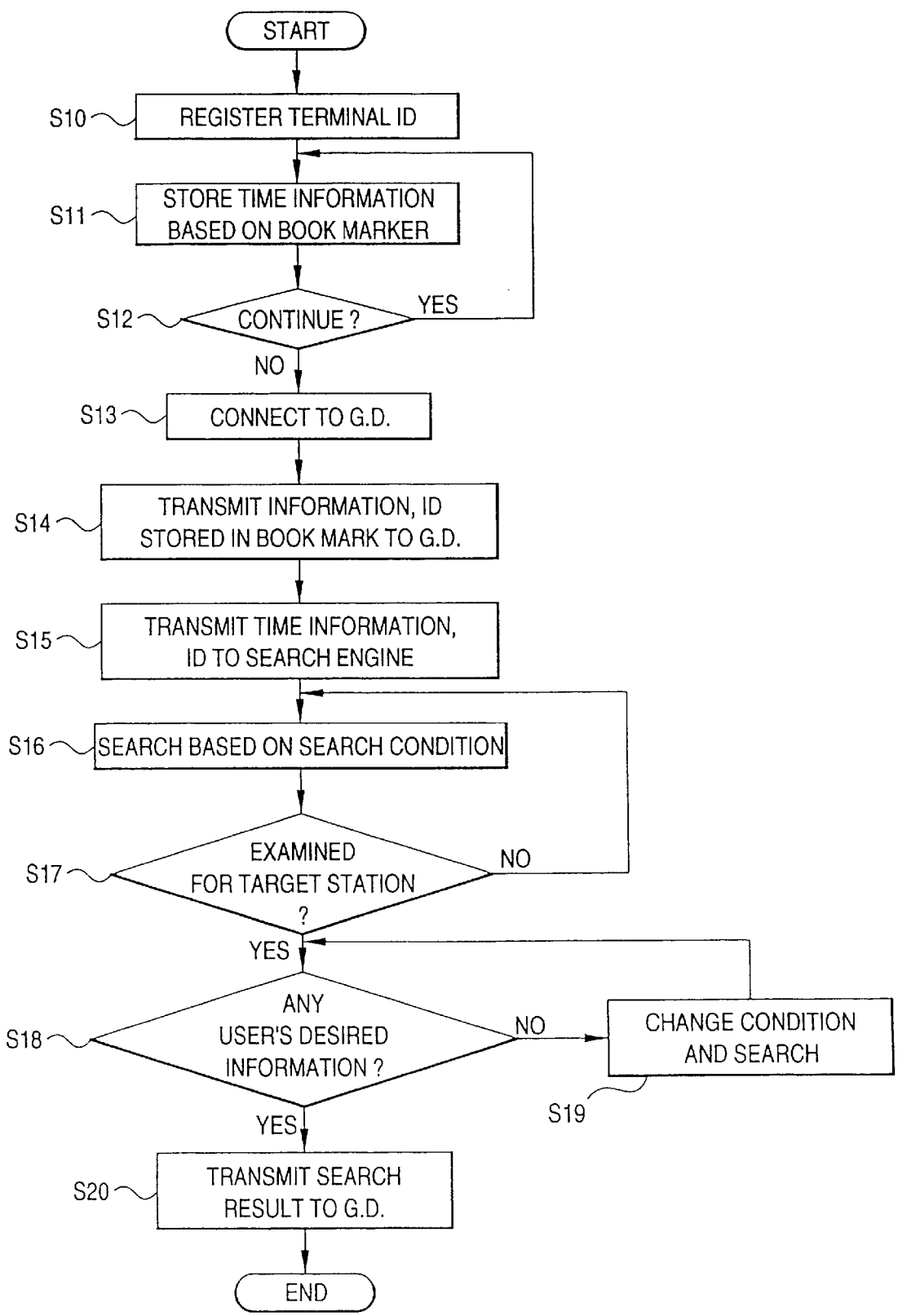
FIG. 9 is a flowchart of one example of search processing in accordance with the present invention.

Next, the content search processing by the system shown in FIG. 2 will be described with reference to the flowchart of FIG. 9. First, in step S10, the terminal ID 27 of the user's book marker 4 is registered to the book mark search engine 10 described above. The user can use his book marker at any place, such as on a street or in a car. For example, if the user likes a music piece received by a radio mounted in a car, the user pushes the button 20 of the book marker at the time and place he hears that music piece. The time information when the button 20 is pushed is stored in the memory 26 of the book marker 4 (step S11). A plurality of time information pieces may be stored in the memory 26 of book marker 4 (step S12).

When the book marker 4 and the gateway device 11 (abbreviated as G.D in FIG. 9) are connected to each other as in step S13, the time information stored in the memory 26 of the book marker is read out together with the terminal ID 27, and transmitted to the gateway device through interface 29 and 37 (step S14). The processing of the step S14 may be set to be automatically started when the book marker 4 and the gateway device 11 are connected to each other in step S13. In the next step S15, the time information and the terminal ID 27 which are transmitted from the book marker to the gateway device are transmitted from the gateway device to the bookmark search engine 10 through the communication line.

In step S16, in the bookmark search engine 10 performs the information search on the basis of the time information and the terminal ID transmitted from the gateway device 11, wherein the time information is used as the search parameter. For example, if the user wishes to know music piece information, the data base 1 is searched on the basis of the time information, and the title of each music piece broadcasted by each radio station at the time represented by the time information is output on the basis of the play list of each broadcast station accumulated in the data base 1.

The search condition is narrowed by using the registration information of the user, that is, the terminal ID27, such that the search of the data base is carried out on the basis of the terminal ID 27 transmitted from the gateway device 11, and the registration information of the user which is registered as the terminal ID 27 (see FIG. 8). For example, when the play list is searched in the data base 1, only the play list of a specific broadcast station is targeted for the search operation by using the broadcast station information ("radio station" column 45) when the terminal ID 27 is registered in the book mark search engine 10.

When the play list of the targeted broadcast station is searched (step S17), the search result in the bookmark search engine 10 is transmitted to the gateway device 11 and displayed on the display frame, an example of which is described later. The displayed search result is checked to determine if this information is desired by the user (step S18). If no information desired by the user is contained in the search result, the gateway device 11 so apprises the book mark search engine 10, and in step S19 the search condition is altered to perform the search operation again. For example, on the basis of the information input to the "post code" column 43 and the "toll call telephone number" column 44, the target broadcast station (as a search condition) is extended to all broadcast stations which can be received within the range defined by the post code and toll call telephone number. The target broadcast station as the search condition is not limited to this, and may be extended to a geographic area adjacent to the area represented by columns 43 and 44.

In the re-searching operation of step S19, the search condition can be automatically set at the book mark search engine 10. For example, through the processing of step S10, the registration content registered by the user is stepwise applied to the search condition. Alternatively, the search condition in the re-searching operation may be directly set by the user who inputs a new search parameter to the gateway device 11. The search parameter thus input is transmitted from the gateway device to the book mark search engine 10.

When information desired by the user is contained in the search result, the search result is transmitted from the book mark search engine to the gateway device in step S20. For example, in a case where the information of a music piece is searched, the audio data of the music piece that is found is transmitted from the book mark search engine 10 to the gateway device 11. The audio data of the music piece may have been accumulated in the data base 2 of the book mark search engine. Alternatively, the other site which is connected to the book mark search engine through the Internet may be requested to transmit the audio data of that music piece.

The user can store the transmitted audio data on the hard disc 36 of the gateway device 11, for example, and reproduce the audio data by sound processor 39 and speaker 90. If the user likes the music piece represented by the audio data, the user can communicate with the book mark search engine 10 by using the gateway device 11 and request to purchase the album (CD or the like) on which the music piece is recorded.

Figure 10:
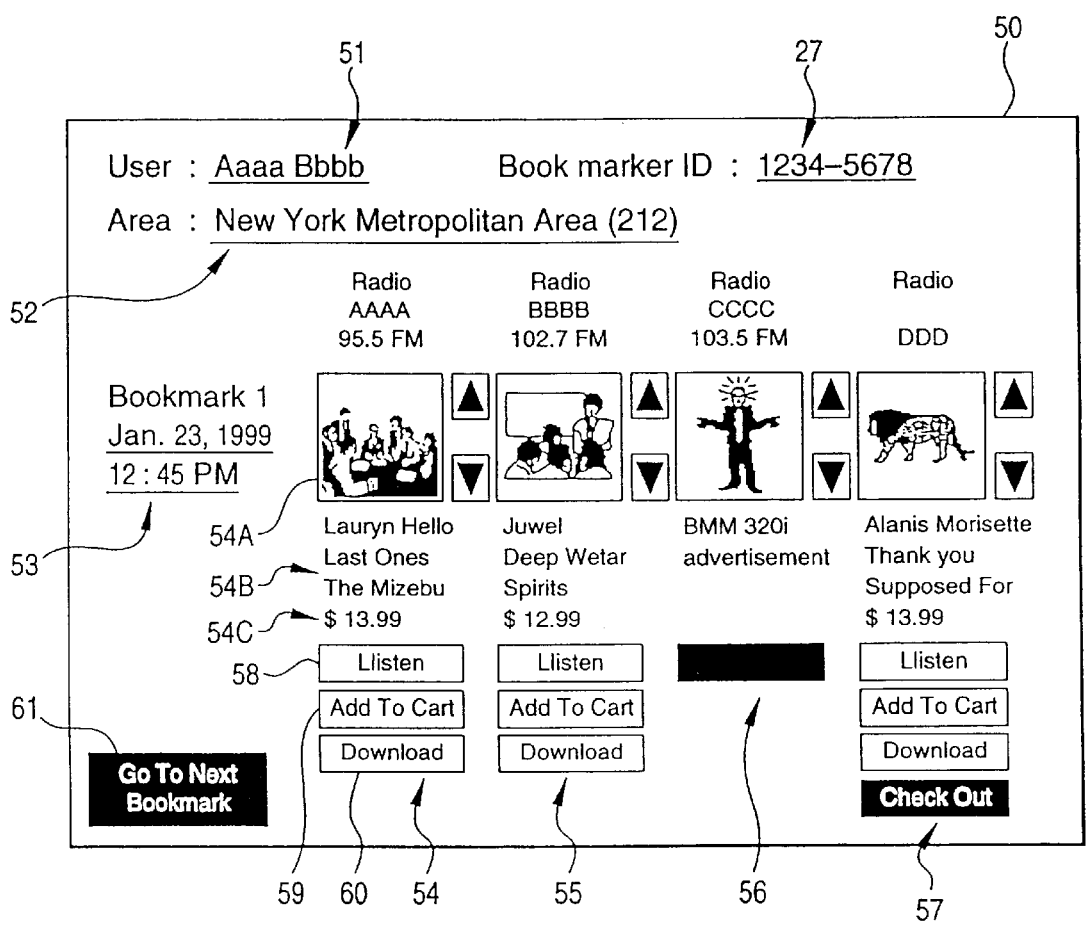
FIG. 10 is a schematic diagram showing an example of the display frame of the gateway device according to the first embodiment.

FIG. 10 shows an example of the display frame of the gateway device 11 which displays the search results. On the upper portion of the frame are displayed the user name 51, the terminal ID 27 and the user's activity area 52 as derived from his registration information. As an example, four broadcast stations in his activity area, consisting of three radio broadcast stations "AAAA", "BBBB" and "CCCC" and one CATV (Cable Television) broadcast station "DDD" are registered.

On the basis of a single time information 53 registered in the book marker 4, that is, time information representing when button 20 was pushed, the search results on the four broadcast stations in the book mark search engine 10 are displayed as displays 54, 55, 56 and 57, respectively. In this case, the music pieces that were broadcasted at the broadcast stations "AAAA", "BBBB" and "DDD" at the time shown in the time information 53 are displayed. On the other hand, display 54 shows that a commercial was broadcasted by the broadcast station "CCCC". As an illustrative example, the display 54 indicating music piece broadcasted by the broadcast station "AAAA" is a jacket image 54A of the CD on which that music piece is recorded and this jacket image is displayed below the name of the broadcast station and the frequency band of the broadcast. Also displayed are the title of the music piece, the name of the singer and the selling price of the CD.

Disposed below the selling price 54C are graphical user interface buttons 58, 59 and 60 which can be operated by the user of the gateway device 11. By operating the button 58, the audio data of the music piece are transmitted from the book mark search engine 10 to the gateway device, processed by the sound processor 39 and then reproduced by the speaker 90. The audio data thus transmitted is not stored in, for example, the hard disc 36 of the gateway device.

The user can select a desired music piece from the music pieces broadcasted by the respective broadcast stations "AAAA", "BBBB", "CCCC" or "DDD" on the basis of the jacket image 54A, the title of the music piece, the singer name 54B and the audio data of the music piece.

The button 59 is used when the user wishes to purchase the CD in which the desired music piece is recorded. The button 60 is used when the user wishes to down-load the audio data of the desired music piece and store the data on the hard disc 36. When the CD is purchased or the music piece is down-loaded by the button 59 or 60, the charge therefor is paid through a credit card or cash card using the card number shown in FIG. 8.

In FIG. 10, the buttons 58, 59 and 60 preferably are not displayed for the commercial broadcast by the broadcast station "CCCC", however, a button to purchase an advertised article may be provided separately.

When the number of registered broadcast stations is large and thus they all cannot be displayed on the frame 50 at one time, information of the other registered broadcast stations can be displayed by operating the button 61.

In the foregoing description it has been assumed that the book marker 4 is a dedicated device for storing time information. As an alternative, the function of the book. marker may be implemented in portable communication equipment such as a cellular phone, PHS (Personal Hand-Phone System), global positioning system (GPS) or the like. The button 20 may be disposed together with dial keys or the like in such apparatus and the telephone number registered for that apparatus may function as terminal ID 27. The function of the button 20 may be implemented by a prescribed combination of the dial keys or by a separate function key. When the function of the book marker 4 is implemented by, for example, a GPS, the position of the user can be pinpointed, and thus the broadcast stations can be narrowed to perform a more accurate searching operation.

As a modification of the embodiment described above, the button 20 may be implemented in software in the gateway device 111. For example, the function of the button 20 for storing the time information may be allocated to a predetermined key of the gateway device 11 or to a predetermined position on the display frame, such as a predetermined icon so that time information is stored by clicking on the icon with a pointing device such as a mouse or the like. The terminal ID 27 may be stored in a predetermined area of ROM 32, RAM 33 or the hard disc 36 of the gateway device 11.

When the user selects the icon or the like which is allocated as the button 20 in the gateway device 11, the time information representing the time at which this operation is carried out is stored in a predetermined area of RAM 33 or the hard disc 36. The time information thus stored is read out, and both the time information and the terminal ID 27 are transmitted to the book mark search engine 10 through the communication line 8. In the book mark search engine, the searching operation is carried out on the basis of the information thus transmitted, and the search result is transmitted from the book mark search engine to the gateway device through the communication line 8.

When the searching operation is carried out in the book mark search engine 10, a unique terminal ID 27 is supplied from each book marker 4 to the book mark search engine. Therefore, by using the terminal ID 27, it is known how many persons request and down-load each specific music piece, and this may be used for market research, etc.

Next, a second embodiment of the present invention will be described. In the first embodiment above mentioned, the book marker 4 is of a simple construction, and the time information is stored therein by pushing the button 20. In the second embodiment, the book marker 4 is installed in a radio receiver.

Figure 11:
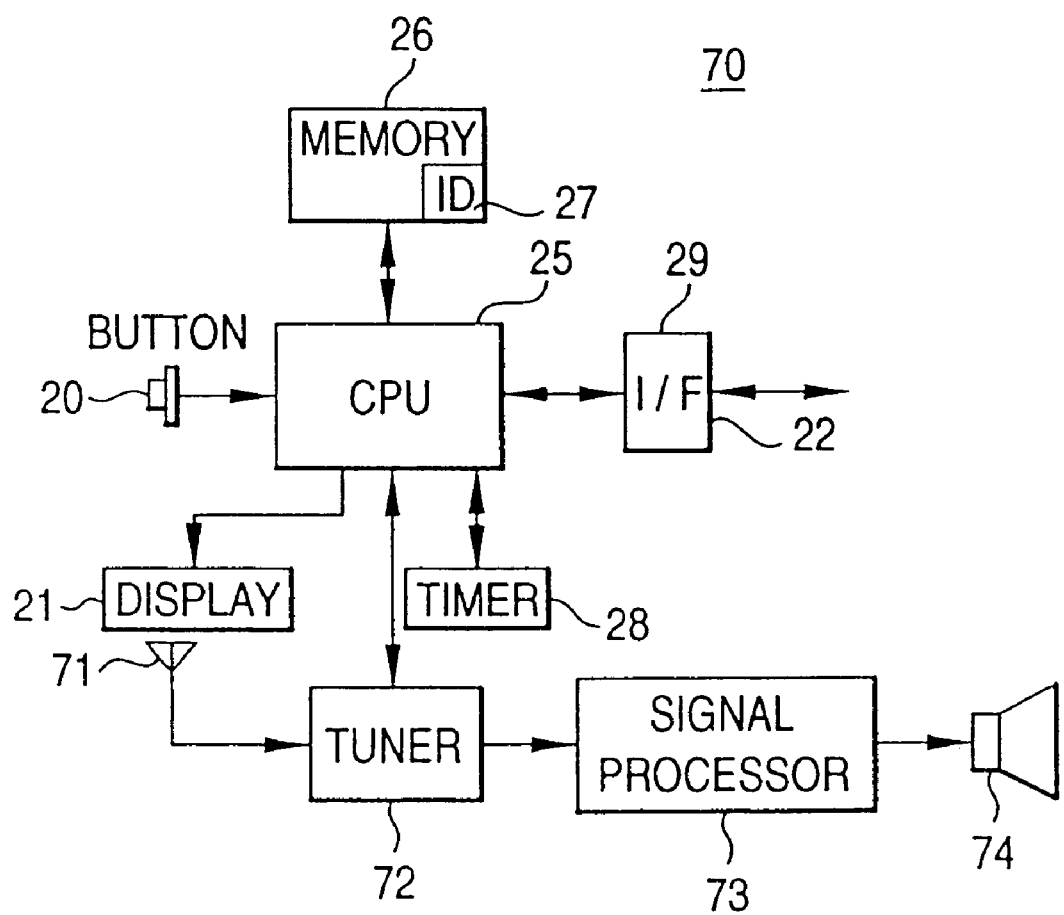
FIG. 11 is a block diagram showing an example of the book marker installed in a radio receiver according to a second embodiment.

FIG. 11 shows an example of the construction of the book marker installed in the common housing of a radio receiver 70. In FIG. 11, those parts of book marker 4 shown in FIG. 5 are represented by the same reference numerals, and the detailed description thereof is omitted. A radio wave received by an antenna 71 is supplied to a tuner 72 which selects a predetermined frequency band on the basis of user operation to select the reception of a desired broadcast station. The signal thus selected is subjected to conventional processings such as detection, demodulation and the like to be converted to an audio signal which is supplied to a signal processing circuit 73 whereat it is subjected to amplification processing, etc., and then reproduced by a speaker 74.

The station-selecting information in the tuner 72 is supplied to CPU 25. For example, the frequency hand information of a selected broadcast station is supplied to CPU 25. In the CPU, time information is stored in the memory 26 when the button 20 is pushed along with the supplied station-selecting information. As in the case of the embodiment shown in FIG. 5, the terminal ID 27 is pre-stored in a predetermined area of the memory 26. The stored station-selecting information, the time information and the terminal ID 27 are read out by the CPU 25 and coupled to interface 29.

If desired, the memory 26 also may store a table representing the corresponding relationship between the frequency band and the name of the broadcast station. This table may be used to convert the supplied frequency band information to the name of the broadcast station.

The tuner 72 may be designed so that desired frequency bands of plural broadcast stations are preset and the frequency bands of these plural broadcast stations are switched at the time of reception so that the broadcast station name data is supplied directly from the tuner 72 to CPU 25.

Figure 12:
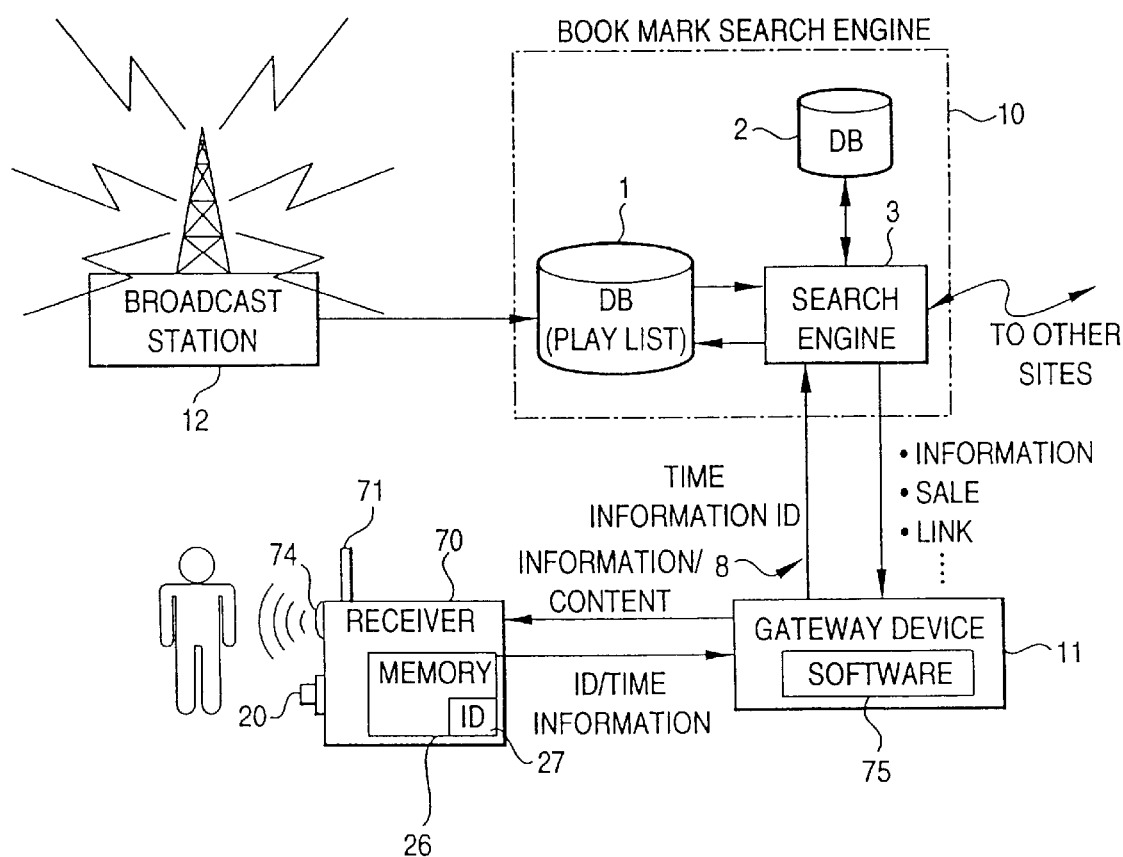
FIG. 12 is a schematic diagram of an example of the search system according to a second embodiment.

FIG. 12 shows an example of the search system according to this embodiment. In FIG. 12, those parts of the search system of FIG. 2 are represented by the same reference numerals, and the detailed description thereof is omitted. In the radio receiver 70, a broadcast station is selected by the user who selects a specific frequency band, and the radio wave broadcasted from the broadcast station 12 is received. Audio output is reproduced by the speaker 74. When a favorite music piece is broadcasted, the user pushes the button 20, whereupon the time information representing the time at which the button is pushed is stored in the memory 26. Also the station-selecting information of the radio receiver 70 is stored in the memory and is associated with the time information.

The radio 7 receiver 70 and the gateway device 11 are connected to each other by a specific interface. As in the case of the first embodiment, the connection may be performed by using USB, IEEE-1394, RS-232C or IrDA as the interface protocol.

As in the case of the embodiment of FIG. 2, software 75 for controlling communication between the radio receiver 70 and the book mark search engine 10 and the display of the display frame (described later) is resident in the gateway device 11. The time information, the station-selecting information and the terminal ID 27 which are stored in the memory 26 of the radio receiver 70 are transmitted from the radio receiver 70 through the interface to the gateway device 11. Further, the time information, the station-selecting information and the terminal ID 27 are supplied from the gateway device 11 through the communication line 8 to the book mark search engine 10.

In the book mark search engine 10, the station-selecting information is used as a search parameter together with the time information and the terminal ID 27. Accordingly, in the book mark search engine 10, both the broadcast time and the selected broadcast station can be specified, so that the searching operation can be performed quickly and with higher precision.

Figure 13:
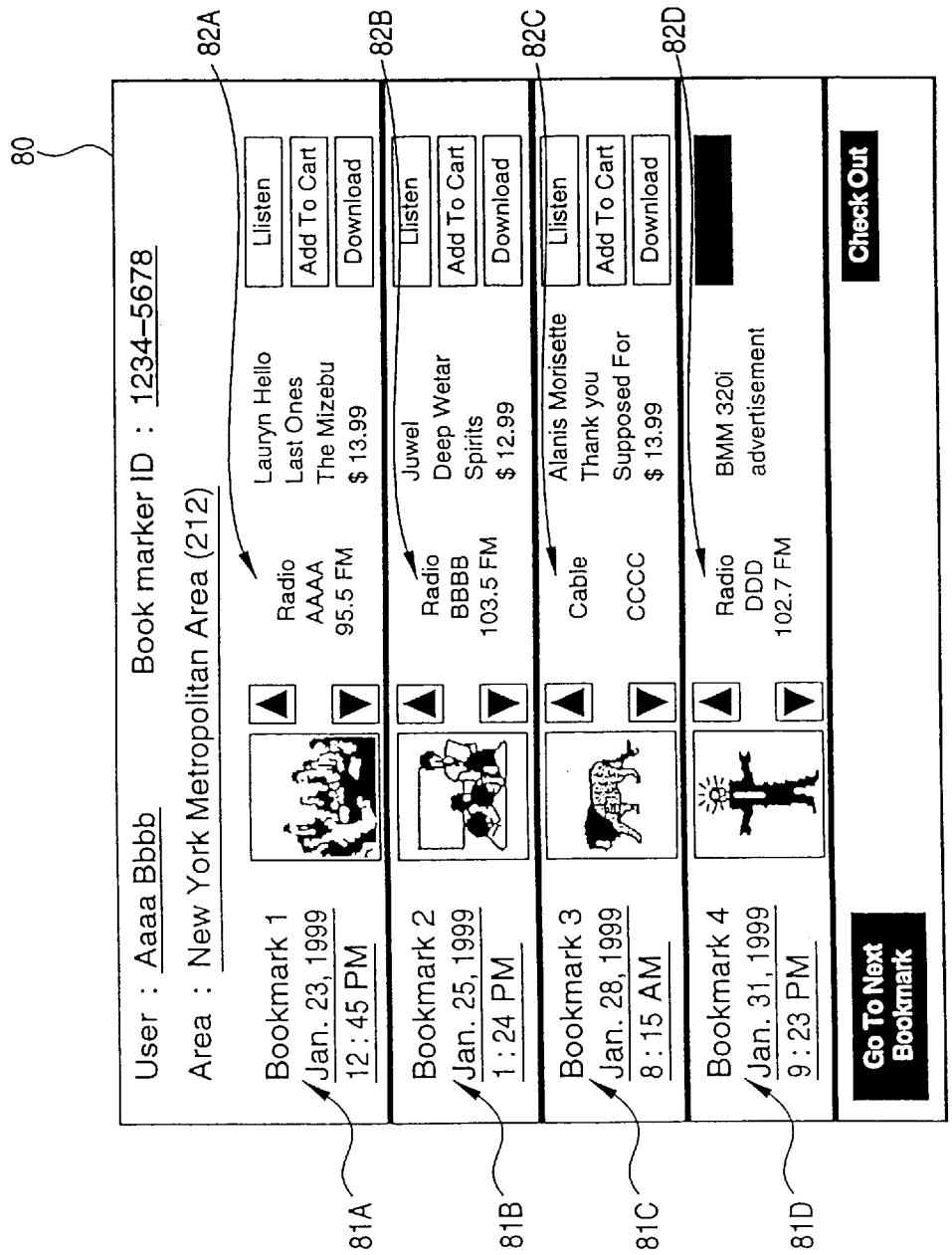
FIG. 13 is a schematic diagram showing an example of the display frame of the gateway device according to the second embodiment.

The search result is transmitted from the book mark search engine 10 through the communication line 8 to the gateway device 11 for predetermined processing, and then displayed on the display means of the gateway device. FIG. 13 shows an example of such a search result display. Since the station-identifying information is contained in the search parameter, a broadcast received by the radio receiver at any time can be uniquely specified. Accordingly, as shown in FIG. 13, time information 81A, 81B, 81C and 81D and search results 82A, 82B, 82C and 82D are displayed in one-to-one correspondence, respectively, from which the user can obtain his/her favorite information.

Figure 14:
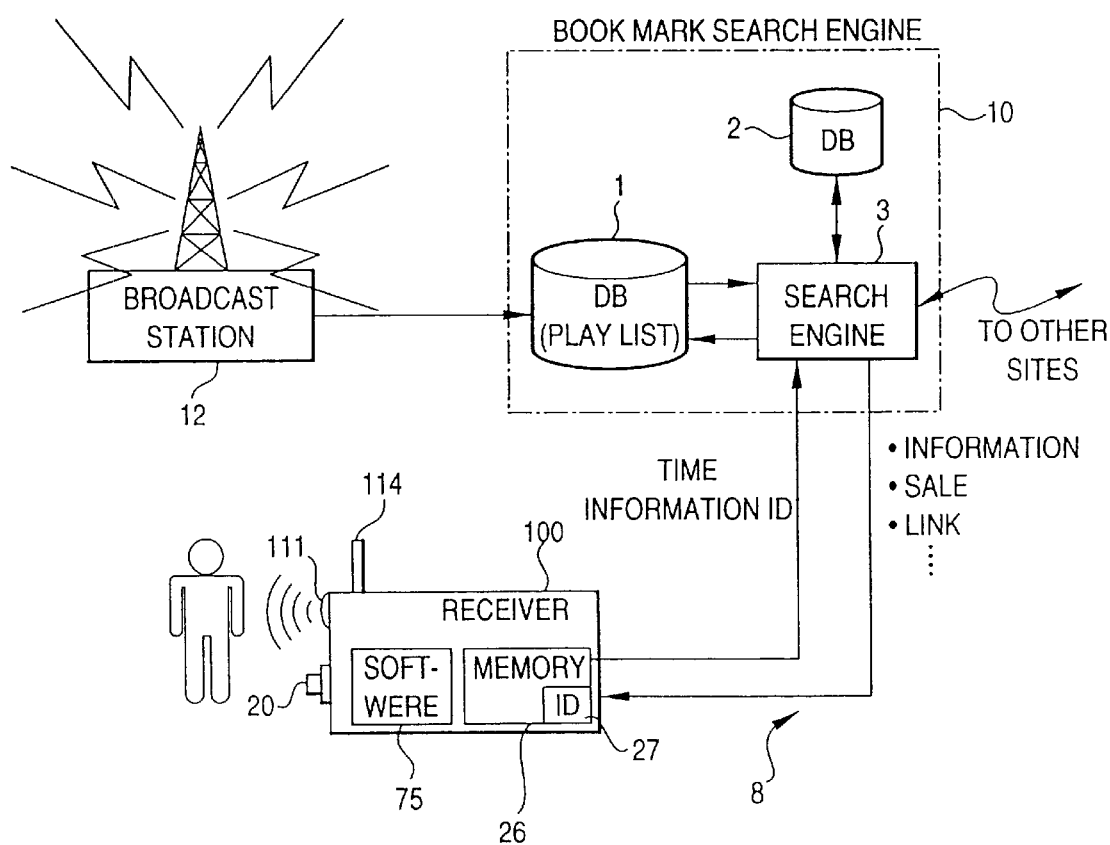
FIG. 14 is a schematic diagram of the search system according to a modification of the second embodiment.

FIG. 14 shows an example of a search system according to a modification of the second embodiment. In this modification, the function of the book marker 4 is incorporated into a radio receiver 100 to obtain a reception time and broadcast station information, and also the software 75 mounted in the gateway device 11 is mounted in the radio receiver 100.

In the modification shown in FIG. 14, the radio receiver 100 is provided with the memory 26 in which the time information, the broadcast station information and the terminal ID (not shown) are stored. The operation of this system is substantially the same as the operation of the embodiment described with reference to FIG. 9. That is, the user receives a radio broadcast from a broadcast station 12 through the radio receiver 100, and reproduces the broadcasted segments through a speaker 111. The user listens to the reproduced sound, and pushes the button 20 if he likes a music piece being broadcasted. When the button 20 is pushed, the time information representing the time at which the button is pushed, and the broadcast station information such as the frequency band of the received broadcast are stored in the memory 26 in the radio receiver.

The radio receiver and the book mark search engine 10 are connected to each other through a communication line 8 such as the Internet or the like. The time information, broadcast station information and terminal ID 27 stored in the memory 26 of the radio receiver 100 are transmitted over communication line 8 to the book mark search engine 10. In the book mark search engine, the information searching operation is carried out on the basis of the time information, the broadcast station information and the terminal ID 27 thus transmitted; and the search result is returned to the radio receiver through the communication line 8 for display as a display frame (similar to that of FIG. 13) on display means (not shown). The user can down-load audio data or request the purchase of an article through the communication line 8 by carrying out an operation based on the display frame.

The radio receiver 100 may be of a similar construction as the radio receiver 70 above, wherein communication between the radio receiver and the book mark search engine 10 is carried out by using an interface similar to interface 29. As before, the search result of the book mark search engine 10 is readily displayed on the display unit 21; and a response to the displayed search result can be transmitted to the book mark search engine by using input means, such as switches, a keyboard, a mouse, or the like (not shown).

Figure 15:
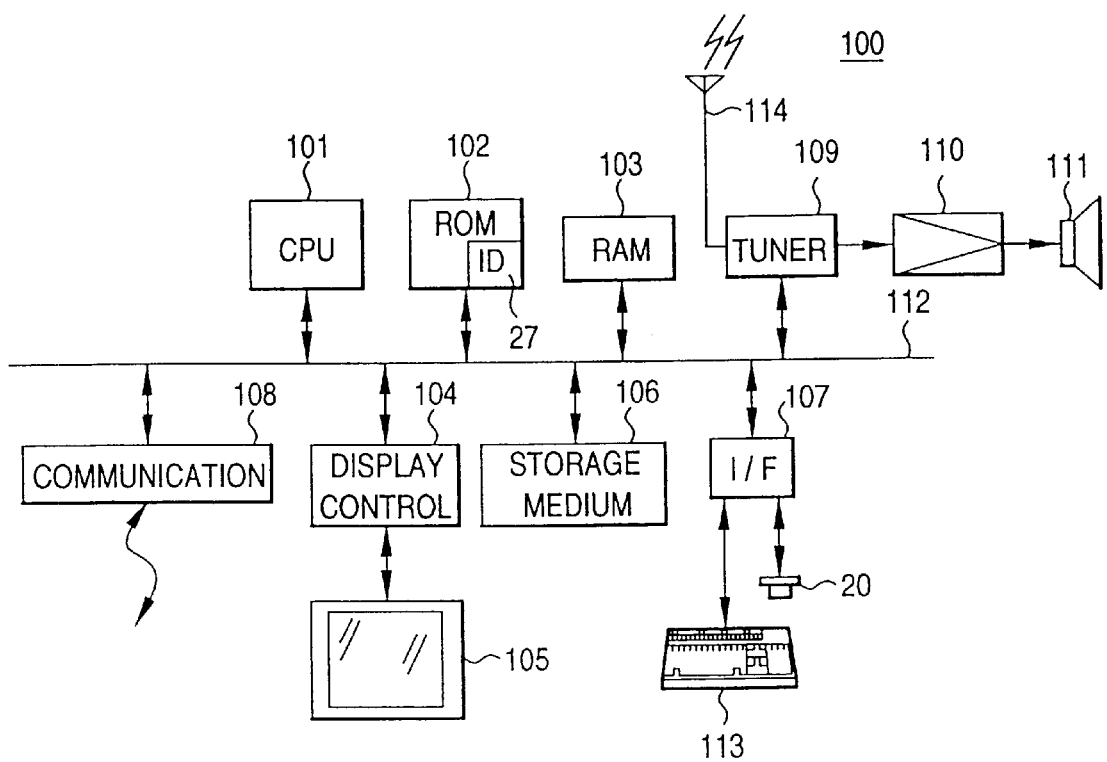
FIG. 15 is a block diagram of an example of a radio receiver installed in a general personal computer as the gateway device.

In the example shown in FIG. 15, the radio receiver 100 may be incorporated into a general personal computer, a lap top computer, by including in the computer a tuner unit 109 which is adapted to receive radio broadcasts. The tuner unit selects the frequency band of a desired broadcast station from the electromagnetic waves received by the antenna 114, performs conventional processing such as detection, demodulation, etc. and then outputs an audio signal. The audio signal output from the tuner unit 109 is amplified by an amplifier 110, for example, and reproduced by a speaker 111.

The tuner unit is connected to a bus 112 such that station information representing the broadcast station to which the tuner unit is tuned is supplied through the bus to CPU 101, etc. The CPU, ROM 102 and RAM 103 are connected to the bus 112. In ROM 102 are stored the terminal ID 27 and a predetermined operating program. In RAM 103 are stored time information representing the activation time of the button 20 and broadcast station information supplied from the tuner unit.

A display control circuit 104, a storage medium 106, an input interface 107 and a communication interface 108 are further connected to the bus 112. The display control circuit 104 is connected to a display 105 (such as an LCD) and drives the display on the basis of a display control signal supplied from the CPU 101 through the bus 112. The storage medium 106 is an auxiliary storage medium in which predetermined data and programs are stored, and may comprise a semiconductor memory, a hard disc, or other removable medium. The communication device 108 comprises a modem, for example, and controls the communication over the communication line 8.

The input interface 107 serves as an interface with the CPU 101. A keyboard 113 and a pointing device such as a mouse, a touch pad device or the like (not shown) are connected to the input interface 107 along with button 20. The display 105 may include a touch panel whose output is supplied to the input interface 107. The communication device 108 serves as an interface with the book mark search engine 10 over the Internet.

In the system described above, the time information and the broadcast station information stored in the memory 26 of the book marker 4 are output through the interface 29 to the gateway device 11 or directly to the book mark search engine 10. If desired, the book marker 4 may be provided with communication means for communicating with another book marker 4' to transmit the time information and the broadcast station information stored in the memory of the book marker 4 to the book marker 4' which may be used by another user. The transmission of the time information and the broadcast station information to the other book marker 4' enables the user of the book marker 4' to search the data base using search parameters obtained by another person, such as a friend or expert.

Communication between the book markers may be based on infrared ray signals such as IrDA, electromagnetic waves or direct connection through a connector and a cable, etc. When the book marker 4 and the book marker 4' are directly connected to each other, the protocol may be USB, IEEE-1394, RS-232C or the like; and communication between the book markers 4 and 4' can be performed by using other wire or wireless (radio) communication methods.

Further, according to the present invention, the book marker 4 should display or store an accurate representation of time. For example, the book marker 4 may be provided with reception means for receiving a standard electromagnetic (or radio) wave on which accurate time information is superposed. The timer 28 (FIGS. 5 and 11) is corrected on the basis of the time information superposed on the electromagnetic wave, whereby accurate time information can be obtained at all times. In Japan, for example, a standard time wave (JG2AS) may be used as the standard radio wave on which accurate time information is superposed. Further, the time casting of television radio broadcasts. may be used as the standard electromagnetic wave.

The book marker 4 may be adapted to detect low-level electromagnetic waves corresponding to the reception frequency to which a radio receiver or television receiver is tuned. The wave thus detected is a wave based on a signal generated in the local oscillation circuit of the receiver, for example. When a user watches a television broadcast or listens to a radio broadcast and likes a particular music piece being broadcast, the user pushes the button of the book marker having the low-level wave detection function. The radio wave received by the television receiver or radio receiver is detected, the frequency of the detected wave is determined, and frequency information thus obtained is stored in the book marker memory together with the time information representing the time at which the button is pushed.

Figure 16:
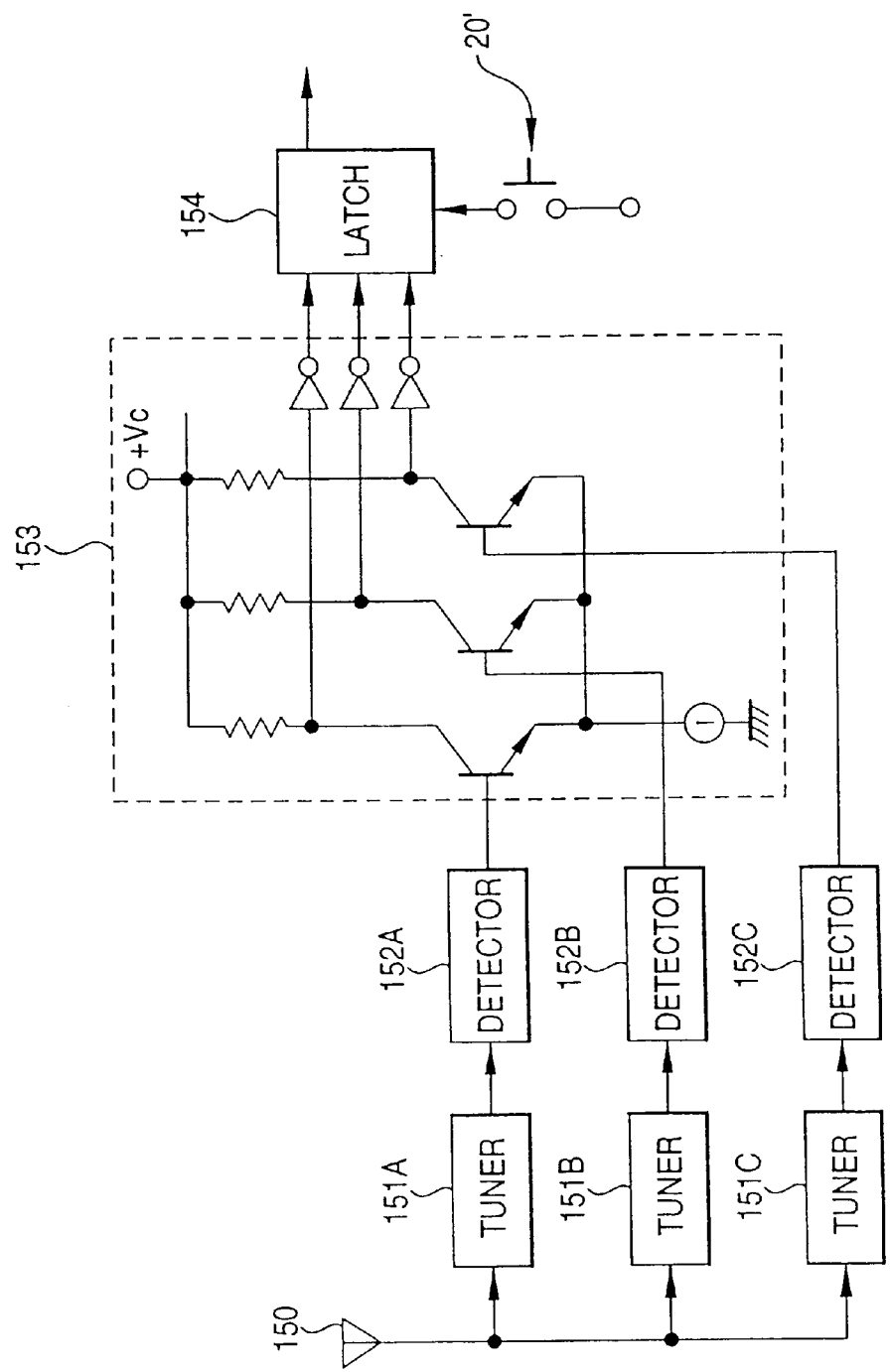
FIG. 16 is a block diagram showing a detection circuit for a radio receiver that may be used in the present invention.

FIG. 16 shows an example of the low-level detection circuit of the book marker. The radio wave received by an antenna 150 is supplied to tuners 151A, 151B and 151C which are designed to selectively receive the radio waves of specific broadcast stations. The outputs of the tuners 150A, 150B and 150C are detected by detection circuits 152A, 152B and 152C respectively, and then supplied to a maximum value detection circuit 153. The maximum value detection circuit includes a differential circuit as shown in FIG. 16, and outputs an output signal only from the channel whose detected signal has the maximum level of the input signals. The output of the maximum value detection circuit 153 is supplied to a latch circuit 154. When a button 20' (which may be ganged with the button 20) is activated, the latch circuit latches the output of the maximum value detection circuit, thereby providing a signal corresponding to the channel of maximum level. This signal is decoded by CPU 25 to be converted to broadcast station information, and then stored in the memory, 26 together with the time information representing the time at which the button 20 is pushed.

The book marker 4 of the present invention may be used in combination with a GPS (Global Positioning System). For example, a built-in GPS may be provided in the book marker 4, and latitude and longitude information at the time the button 20 is pushed is stored in the memory 26 along with the time information. The stored latitude and longitude information thus stored and the time information are afterwards transmitted to the gateway device 1 and used as search parameters. In a large country, like the United States, there are plural time zones. The gateway device 11 may be programmed to correct the time information according to the time zone on the basis of the latitude and longitude information thus transmitted from the GPS, thereby permitting a data base search on the basis of accurate time information. The area in which the user is located can be specified by using the latitude and longitude information obtained by the GPS, and thus radio station identification can be determined more precisely.

Let it be assumed the user pushes the button 20 while walking or moving, for example, while shopping, and at a later time transmits the latitude and longitude information and the time information to the gateway device 11. If the gateway device is provided with a map-plotting application based upon time information and latitude and longitude information, the user can display a schematic route along which he passed, and at what time and at which store he stopped that day. Providing a data base comprising shop information in the search engine 10 permits detailed information to be accumulated on shops at which the user stops. This provides advantageous marketing information.

As described above, according to the present invention, by pushing the button on the book marker, the time at which the button is pushed is stored in the book marker as time information. The book mark search engine may include one data base which accumulates a play list containing the broadcast segment (e.g. titles of music pieces) of each broadcast station and the broadcast time of that segment, and another data base which accumulates information associated with the broadcast segment (e.g. title of the album on which the music piece is recorded, the name of artist, cost of CD, etc.). Therefore, if the user likes a broadcasted music piece, the user merely operates the button of the book marker to store the time information representing the time at which that piece was broadcasted, whereby the user can afterward search the data base for information associated with that piece or entry. Hence, the user can easily obtain information on the music piece and can readily purchase an article relevant to or associated with that piece.

Since the search of the data base is performed on the basis of only the time information which is stored by the user in the book marker, it is unnecessary to transmit information other than the music piece itself from the broadcast station, and thus the broadcast station suffers little load. Also, since the receiver merely stores time information to identify the desired segment, it suffers extremely little load.

Still further, in performing a search for the broadcast segment, the terminal ID resident in each book marker may be transmitted automatically to the book mark search engine together with the time information. Therefore, marketing information relating to how many persons requested and purchased specific items may be compiled.

It will be appreciated that the present invention is applicable to analog or digital broadcasts.

What is claimed is:

1. A search system for searching data bases for information associated with segments of broadcast information comprising:

a portable input device including a storage means for storing time information representing a broadcast time at which a segment is broadcast;

communication means for transmitting the time information stored in said storage means;

a broadcast data base for storing the segments of broadcast information and related information;

a search device including a content data base for accumulating data representing said segments and the broadcast times of respective segments; and search means for receiving the time information transmitted by said communication means to search said broadcast data base and said content data base for information associated with those segments having broadcast times corresponding to the received time information.

2. The search system as claimed in claim 1, wherein said input device further includes identification information storage means for storing identification information to uniquely identify said input device.

3. The search system as claimed in claim 2, wherein said input device further includes means for providing user information identifying the user of said input device; said identification and user information being transmitted with said time information by said communication means.

4. The search system as claimed in claim 3, wherein said search device further includes user information accumulating means for accumulating the identification information and the user information; and said search means searches said information associated with said segments on the basis of the received time information and the identification and user information which is transmitted together with the time information from said communication means.

5. The search system as claimed in claim 1, further including: a gateway device for interactively communicating with said search device to transmit to said search device the time information used by said search means for searching said data base and to which search results from said search means are transmitted; and an interface for connecting said input device and said gateway device and through which the time information from said input device is transmitted.

6. The search system as claimed in claim 5, wherein said interface is a USB interface.

7. The search system as claimed in claim 5, wherein said interface is an infrared-ray interface.

8. The search system as claimed in claim 5, wherein said interface is an IEEE-1394 interface.

9. The search system as claimed in claim 5, wherein said interface is an RS-232C interface.

10. The search system as claimed in claim 5, wherein when said input device and said gateway device are connected to each other by said interface, the time information is automatically transmitted from said input device through said interface to said gateway device, and thence from said gateway device to said search device.

11. The search system as claimed in claim 1, wherein said input device includes a receiver for receiving said broadcast segment, and a common housing for said receiver.

12. The search system as claimed in claim 11, wherein said receiver provides information of a broadcast station over which said broadcast segment is received; wherein said communication means transmits said broadcast station information together with the time information to said search device, and wherein said search means searches said data base for said information associated with said segments on the basis of the broadcast station information and the time information.

13. The search system as claimed in claim 11, wherein said receiver is a radio receiver.

14. The search system as claimed in claim 11, wherein said receiver is a television receiver.

15. The search system as claimed in claim 11, wherein said receiver is a digital broadcast receiver.

16. The search system as claimed in claim 1, wherein said input device includes a portable telephone device, and a common housing for said portable telephone device.

17. The search system as claimed in claim 1, wherein said input device is implemented by computer software.

18. A search device for searching data bases for information associated with segments of broadcast information comprising:

a broadcast data base for storing the segments of broadcast information and related information;

accumulating means for accumulating a content data base representing said segments and broadcast times at which respective segments are broadcasted; and search means for searching the broadcast and content data bases for information associated with those segments having broadcast times corresponding to time information which is input from a portable input device and represents the broadcast time at which a segment is broadcasted.

19. The search device as claimed in claim 18, wherein said input device includes identification information storage means for storing identification information to uniquely identify said input device.

20. The search device as claimed in claim 19, wherein said input device further includes means for providing user information identifying the user of said input device, said identification and user information being input to said search device.

21. The search device as claimed in claim 20, further including user information accumulating means for accumulating the identification information and the user information and wherein said search means searches said information associated with said segments on the basis of the time information input by said input device and the identification and user information of said input device.

22. A portable input device for searching a broadcast data base for storing segments of broadcast information and related information and a content data base having accumulation means for accumulating information representing broadcast segments and broadcast times at which the segments are broadcasted, said input device inputting time information to a search device for searching said broadcast and content data bases for information associated with a broadcast segment on the basis of the broadcast time at which the segment is broadcasted, comprising:

storage means for storing at least the time information representing the broadcast time at which the segment was broadcasted; and communication means for transmitting the time information stored in said storage means.

23. The input device as claimed in claim 22, further including identification information storage means for storing identification information to uniquely identify said input device.

24. The input device as claimed in claim 22, further including a connection interface for interactive communication with a search device for searching said data base for information associated with a broadcast segment on the basis of time information transmitted to said search device, said connection interface connecting said communication means and a gateway device to which search results of said search device are transmitted, wherein said time information is transmitted from said communication means through said interface to said gateway device and thence to said search device.

25. The input device as claimed in claim 24, wherein said interface is a USB communication interface.

26. The input device as claimed in claim 24, wherein said interface is an infrared ray communication interface.

27. The input device as claimed in claim 24, wherein said interface is an IEEE-1394 interface.

28. The input device as claimed in claim 24, wherein said interface is an RS-232C interface.

29. The input device as claimed in claim 24 wherein when said input device and said gateway device are connected by said interface, the time information is automatically transmitted from said input device through said interface to said gateway device, and thence from said gateway device to said search device.

30. The input device as claimed in claim 22, including a common housing, and further including a receiver disposed in said housing for receiving said broadcast segment.

31. The input device as claimed in claim 30, wherein said receiver is an electromagnetic wave receiver.

32. The input device as claimed in claim 31, wherein said receiver provides said input device with information of a broadcast station over which said broadcast segment is received, said communication means transmitting the broadcast station information together with the time information.

33. The input device as claimed in claim 31, wherein said receiver is a radio receiver.

34. The input device as claimed in claim 31, wherein said receiver is a television receiver.

35. The input device as claimed in claim 31, wherein said receiver is a digital broadcast receiver.

36. The input device as claimed in claim 31, including a common housing, and wherein said receiver is a portable telephone device disposed in said housing.

37. The input device as claimed in claim 22, wherein said input device is implemented by computer software.

38. A portable input device for searching a broadcast data base for storing segments of broadcast information and related information and a content data base having accumulation means for accumulating information representing broadcast segments and broadcast times at which the segments are broadcasted, said input device inputting information corresponding to the broadcast time to a search device for searching said broadcast and content data bases for information associated with a broadcast segment, said input device comprising:
   a counter which counts predetermined clock signals;
   storage means for storing a count value of said counter at a time when a segment is broadcasted; and
   communication means for transmitting the count value stored in said storage means.

39. The input device as claimed in claim 38, further including identification information storage means for storing identification information to uniquely identify said input device.

40. The input device as claimed in claim 38, wherein said input information corresponding to broadcast time is determined by said search device as a function of the count value stored in said storage means and the count value of said counter at the time of transmission by said communication means.

41. The input device as claimed in claim 38, further comprising a connection interface for interactive communication with a search device for searching said data base for information associated with a broadcast segment on the basis of time information supplied to said search device, said interface connecting said communication means and a gateway device to which search results of said search device are transmitted, wherein said count value is transmitted from said communication means through said interface to said gateway device, the count value of the counter at the time of transmission is transmitted to said gateway device, said gateway device determines first time information corresponding to the count value and second time information corresponding to the count value at the time of transmission, and the first and second time information are transmitted from said gateway device to said search device.

42. The input device as claimed in claim 41, wherein said interface is a USB interface.

43. The input device as claimed in claim 41, wherein said interface is an infrared ray communication interface.

44. The input device as claimed in claim 41, wherein said interface is an IEEE-1394 interface.

45. The input device as claimed in claim 41, wherein said interface is an RS-232C interface.

46. The input device as claimed in claim 41, wherein the count value and the count value at the time of transmission are automatically transmitted from said input device through said interface to said gateway device and from said gateway device to said search device when said gateway device and said input device are connected to each other by said interface.

47. The input device as claimed in claim 38, including a common housing, and further including a receiver disposed in said housing for receiving said broadcast segment.

48. The input device as claimed in claim 47, wherein said receiver is an electromagnetic wave receiver.

49. The input device as claimed in claim 48, wherein said receiver provides said input device with information of a broadcast station over which said broadcast segment is received, said communication means transmitting the broadcast station information together with the count value and the count value at the time of transmission.

50. The input device as claimed in claim 48 wherein said receiver is a radio receiver.

51. The input device as claimed in claim 48, wherein said receiver is a television receiver.

52. The input device as claimed in claim 48, wherein said receiver is a digital broadcast receiver.

53. The input device as claimed in claim 48, wherein said receiver is a portable telephone device.

54. The input device as claimed in claim 38, wherein said input device is implemented by computer software.

55. A system for searching a broadcast data base for storing segments of broadcast information and related information and a content data base for information associated with music pieces broadcasted by a broadcast station, said data bases storing a play list of music pieces broadcasted by different broadcast stations at respective times, comprising:
   a portable book marker operable by a user to store information representing the time at which the book marker is operated;
   a transmitter for transmitting the stored time information together with user identification (ID) information; and a search engine for receiving the transmitted time and ID information and for searching said broadcast and content data bases as a function of said time and ID information to select information associated with music pieces that were broadcasted by a set of broadcast stations at a time that matches said time information.

56. The system of claim 55 further including a display for displaying the selected information.

57. A method of searching data bases for information associated with segments of broadcast information comprising the steps of:

accumulating a broadcast data base for storing the segments of broadcast information and related information;

accumulating a content data base representing said segments and broadcast times of respective segments;

registering time information representing the broadcast time at which a user-desired segment is broadcast in a portable input device:

transmitting the registered time information to a data base search engine; and using the transmitted time information to search said broadcast and content data bases for information associated with those segments having broadcast times which match the registered time information.

58. A method of searching a broadcast data base for storing segments of broadcast information and related information and a content data base for information associated with segments of broadcast information comprising the steps of:

accumulating a broadcast data base for storing the segments of broadcast information and related information, accumulating a content data base representing said segments and broadcast times at which respective segments are broadcasted;

searching the broadcast and content data bases for information associated with those segments having broadcast times which match time information that is input by a user through a portable input device, and that represents the broadcast time at which a user-desired segment is broadcasted.

59. A method of inputting search parameters for searching a broadcast data base for storing segments of broadcast information and related information and a content data base comprised of information representing broadcast segments, broadcast times at which segments are broadcasted and broadcast stations over which the segments are broadcasted, said method comprising the steps of:

registering, in a portable input device, at least time information representing the broadcast time at which a user-desired segment is broadcasted; and transmitting as data base search parameters the registered time information, user identification information and geographic area information representing the geographic area at which said user is located.

60. The method of claim 59 wherein said step of registering includes the step of detecting the identity of the broadcast station over which said user-desired segment is broadcasted, the broadcast station information identity being transmitted as a search parameter together with the time information.

61. The method of claim 59 wherein said step of registering time information comprises counting predetermined clock signals storing a first count value at the time said user-desired segment is broadcasted, producing a second count value at the time said search parameters are transmitted, and calculating time information as a function of said first and second count values.

* * * * *